United States Patent
Bevirt (10) Patent No.: US 8,740,160 B2
(45) Date of Patent: *Jun. 3, 2014

(54) MOUNTING APPARATUS USING BALL AND SOCKET JOINTS WITH GRIPPING FEATURES

(75) Inventor: Joeben Bevirt, Santa Cruz, CA (US)

(73) Assignee: Daymen US, Inc., Petaluma, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 13/006,434

(22) Filed: Jan. 14, 2011

(65) Prior Publication Data

US 2011/0108683 A1      May 12, 2011

Related U.S. Application Data

(63) Continuation of application No. 11/801,234, filed on May 9, 2007, now Pat. No. 7,891,615, which is a continuation of application No. 11/324,994, filed on Jan. 3, 2006, now abandoned.

(51) Int. Cl.
| | | |
|---|---|---|
| *F16M 11/40* | (2006.01) | |
| *G03B 17/56* | (2006.01) | |
| *F16M 11/14* | (2006.01) | |
| *F16M 11/16* | (2006.01) | |
| *F16M 11/04* | (2006.01) | |
| *F16M 11/20* | (2006.01) | |

(52) U.S. Cl.
CPC .............. *F16M 11/40* (2013.01); *F16M 11/14* (2013.01); *F16M 11/16* (2013.01); *F16M 11/041* (2013.01); *F16M 11/2078* (2013.01)

USPC .................. 248/181.1; 248/163.1; 248/187.1; 403/56; 396/428

(58) Field of Classification Search
USPC ............. 248/181.1, 163.1, 168, 187.1, 177.1, 248/188; 403/56, 299, 381, 291, 373; 285/146.1, 261, 146.2, 146.3; 396/428
See application file for complete search history.

(56) References Cited

U.S. PATENT DOCUMENTS

| | | | | |
|---|---|---|---|---|
| 5,276,596 | A * | 1/1994 | Krenzel ....................... | 362/191 |
| 5,647,565 | A * | 7/1997 | Wei ............................... | 248/168 |
| 6,196,504 | B1 * | 3/2001 | Lemke ........................ | 248/187.1 |
| 6,672,788 | B2 * | 1/2004 | Hathaway ...................... | 403/90 |
| 7,138,297 | B2 * | 11/2006 | Iijima et al. .................. | 438/113 |
| 7,290,740 | B2 * | 11/2007 | Joy et al. ..................... | 248/187.1 |
| 7,533,906 | B2 * | 5/2009 | Luettgen et al. ........... | 285/146.1 |
| 7,891,615 | B2 * | 2/2011 | Bevirt ........................ | 248/181.1 |

* cited by examiner

*Primary Examiner* — Tan Le
(74) *Attorney, Agent, or Firm* — Michael A. Guth (57) ABSTRACT

The present invention is directed towards ball and socket joint connectors which, when interconnected, form a flexible assembly. In some embodiments, the ball and socket joint connectors are designed and constructed such that the interference fit of the ball and socket causes creep in the material resulting in more even frictions in the various ball and socket joints. In some embodiments, the ball and socket joint connectors utilize an over-molded strip around the outside of the connector to facilitate in their use for gripping. In an exemplary embodiment utilizing the aforementioned ball and socket joint connectors, a tripod apparatus uses legs comprising the ball and socket joint connectors for support and for gripping objects.

15 Claims, 14 Drawing Sheets

SECTION A-A

MOUNTING APPARATUS USING BALL AND SOCKET JOINTS WITH GRIPPING FEATURES

REFERENCE TO RELATED APPLICATIONS

This application is a continuation of U.S. patent application Ser. No. 11/801,234 to Bevirt filed May 9, 2007 now U.S. Pat. No. 7,891,615, which is a continuation of U.S. patent application Ser. No. 11/324,994 to Bevirt filed Jan. 3, 2006 now abandoned.

BACKGROUND

1. Field of the Invention

The present invention relates to connectors which interconnect into a flexible assembly, and more specifically to a mounting apparatus using ball and socket joint connectors.

2. Description of Related Art

Typical tripod assemblies consist of three rigid legs which are splayed out to form a support structure for devices such as cameras. The legs are usually rigid and adapted to provide support off of the ground or other flat surface. Some tripods have some adjustment to leg length which may allow for some deviation from flatness in the surface upon which they are mounted.

Such tripods are limited in the manner in which they support devices such as cameras. What is called for is a mounting apparatus that may function as a tripod and also as a grip mount for the mounting to vertical members.

SUMMARY

The present invention is directed towards ball and socket joint connectors which, when interconnected, form a flexible assembly. Each connector includes a body with a first and second end portion. An external socket engaging surface is provided at one end of the body. The other end of the body has an internal cavity. The socket engaging surface of one connector is snapped into the internal cavity of another to interconnect the connectors.

In some embodiments, the ball and socket joint connectors utilize an over-molded strip around the outside of the connector to facilitate in their use for gripping. In an exemplary embodiment utilizing the aforementioned ball and socket joint connectors, a mounting apparatus uses legs comprising the ball and socket joint connectors for support.

DETAILED DESCRIPTION

Figure 1:
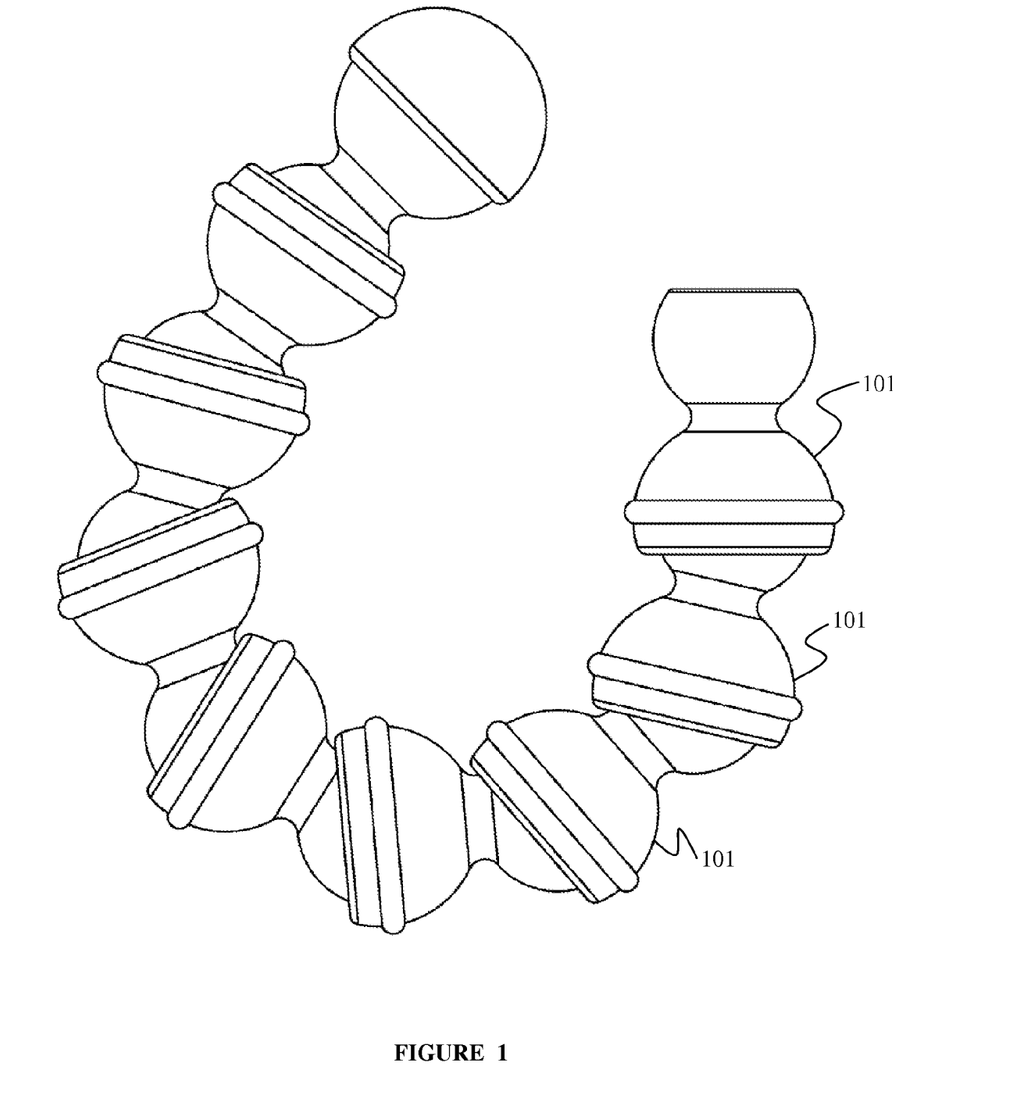
FIG. 1 illustrates a side view of a plurality of connected connectors according to some embodiments of the present invention.
Figure 2:
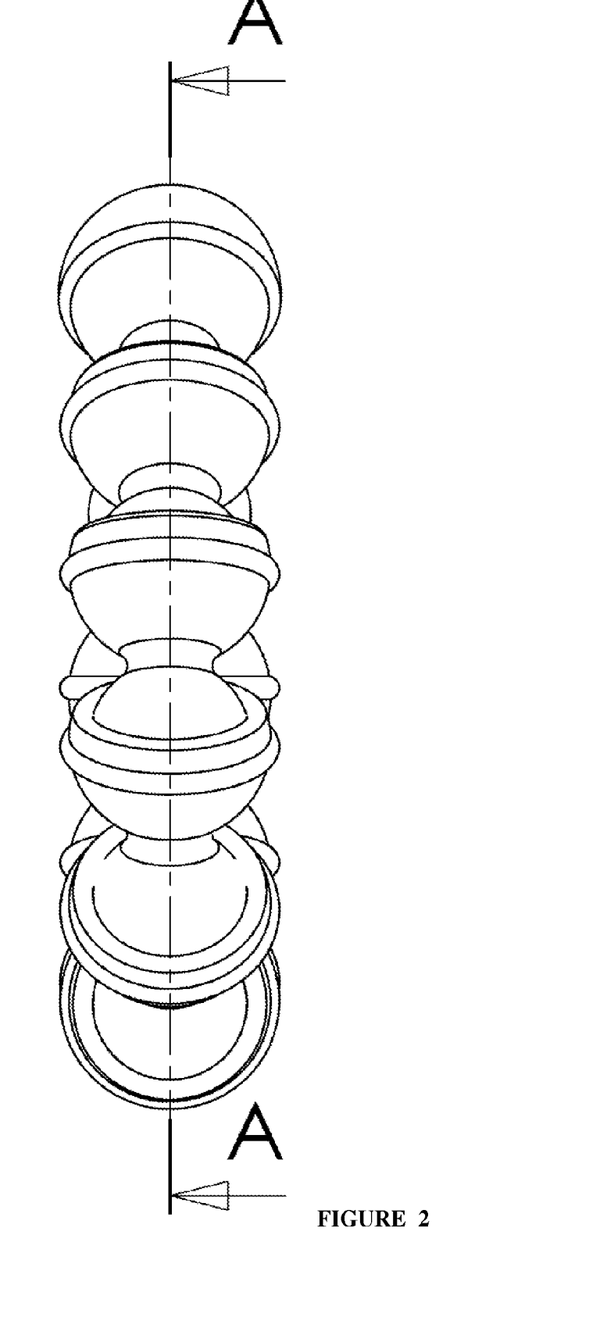
FIG. 2 illustrates an end view of a plurality of connected connectors according to some embodiments of the present invention.
Figure 3:
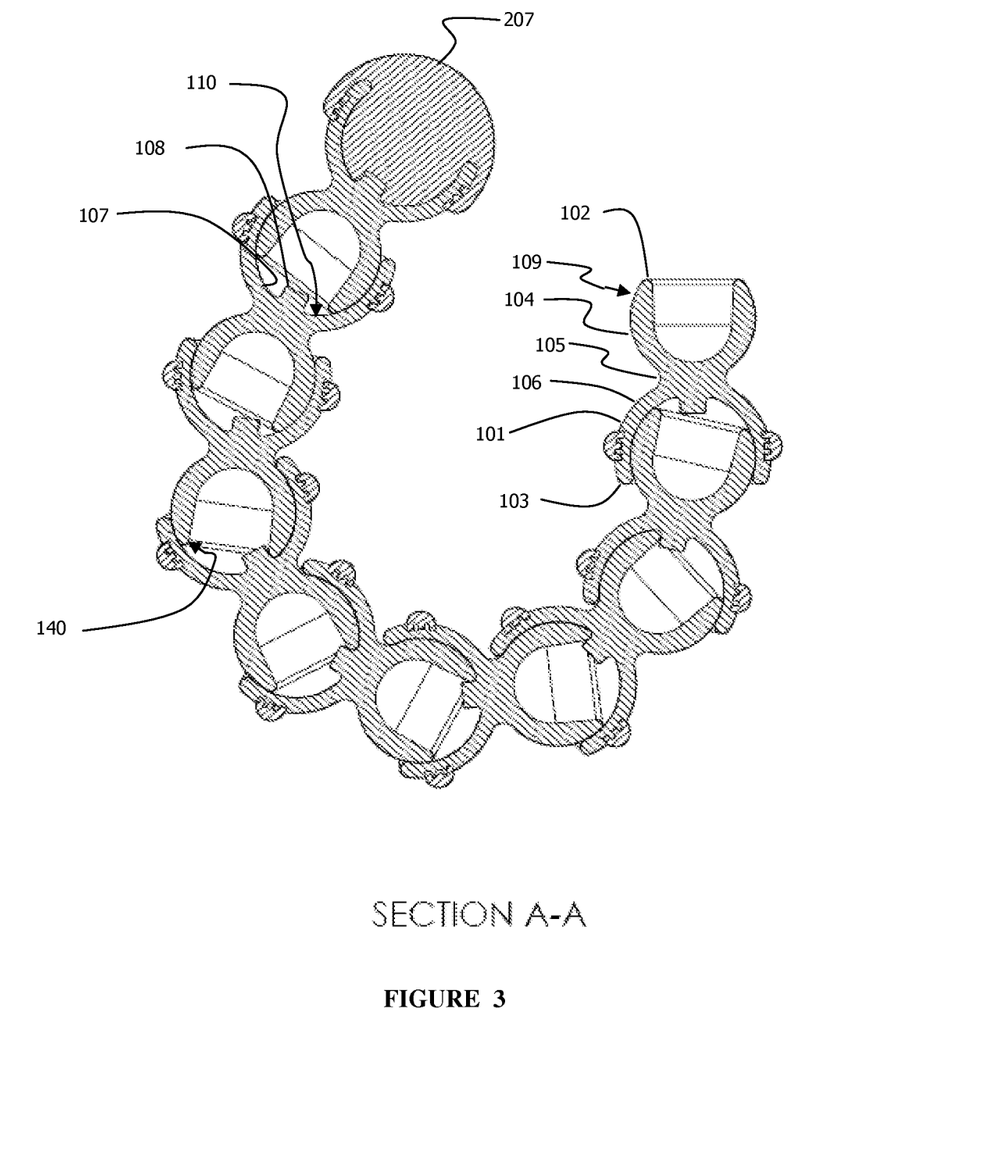
FIG. 3 is a cross-sectional view of a plurality of connected connectors according to some embodiments of the present invention.

FIGS. 1, 2, and 3 illustrate a plurality of ball and socket joint connectors 101 according to some embodiments of the present invention. A connector 101 has a first end portion 102 and a second end portion 103. A socket engaging end surface 104 is present at the first end 102. The first end portion 102 is substantially hollowed out.

The second end portion 103 has a body 106 with an internal socket receiving cavity 107. The inner surface 110 of the an internal socket receiving cavity 107 is adapted to fit over the socket engaging end surface 104 of another connector 101, or of another piece with a similar socket engaging end surface. A neckdown 105 separates the first end portion 102 from the second end portion 103. A stop nub 108 acts as a mechanical stop to prevent over angulation and possible unintentional separation of a ball and socket joint connector pair.

Figure 4:
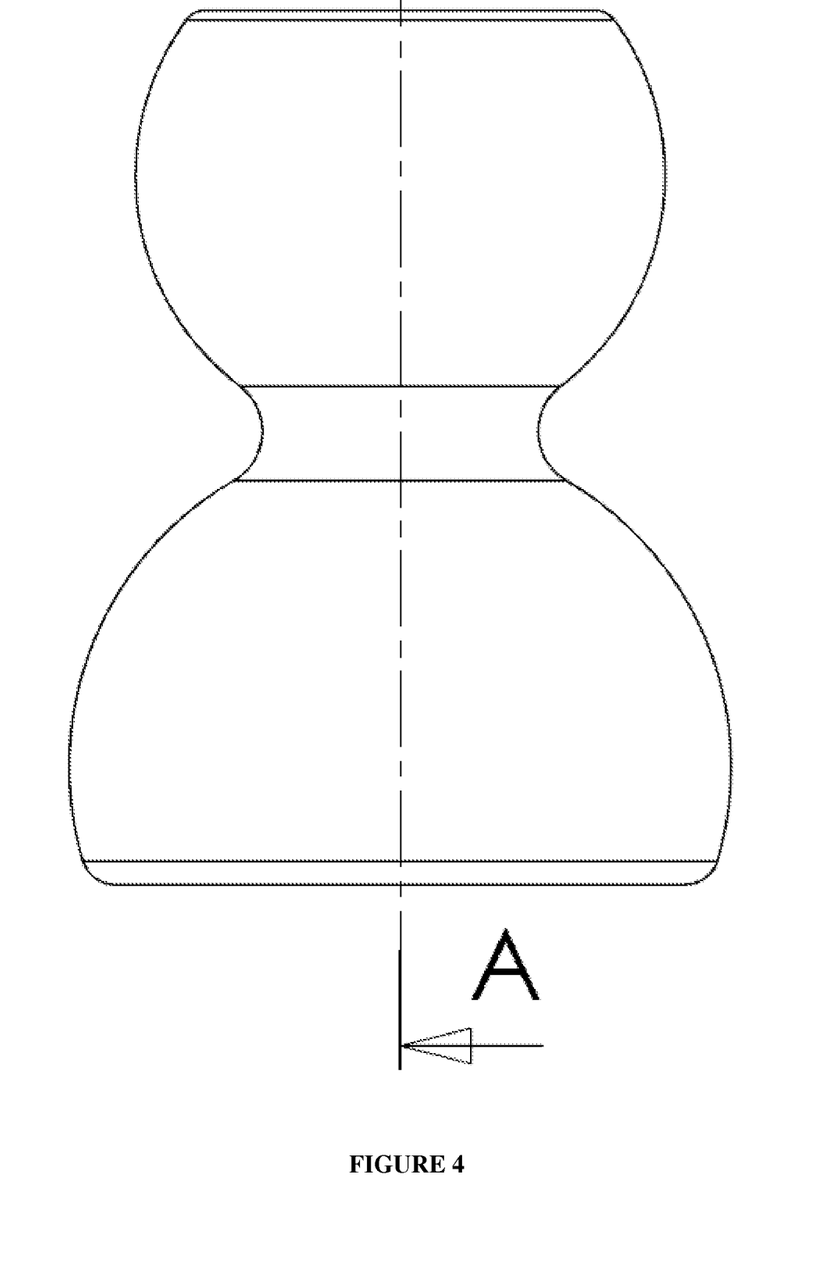
FIG. 4 is a side view of a connector according to some embodiments of the present invention.
Figure 4A:
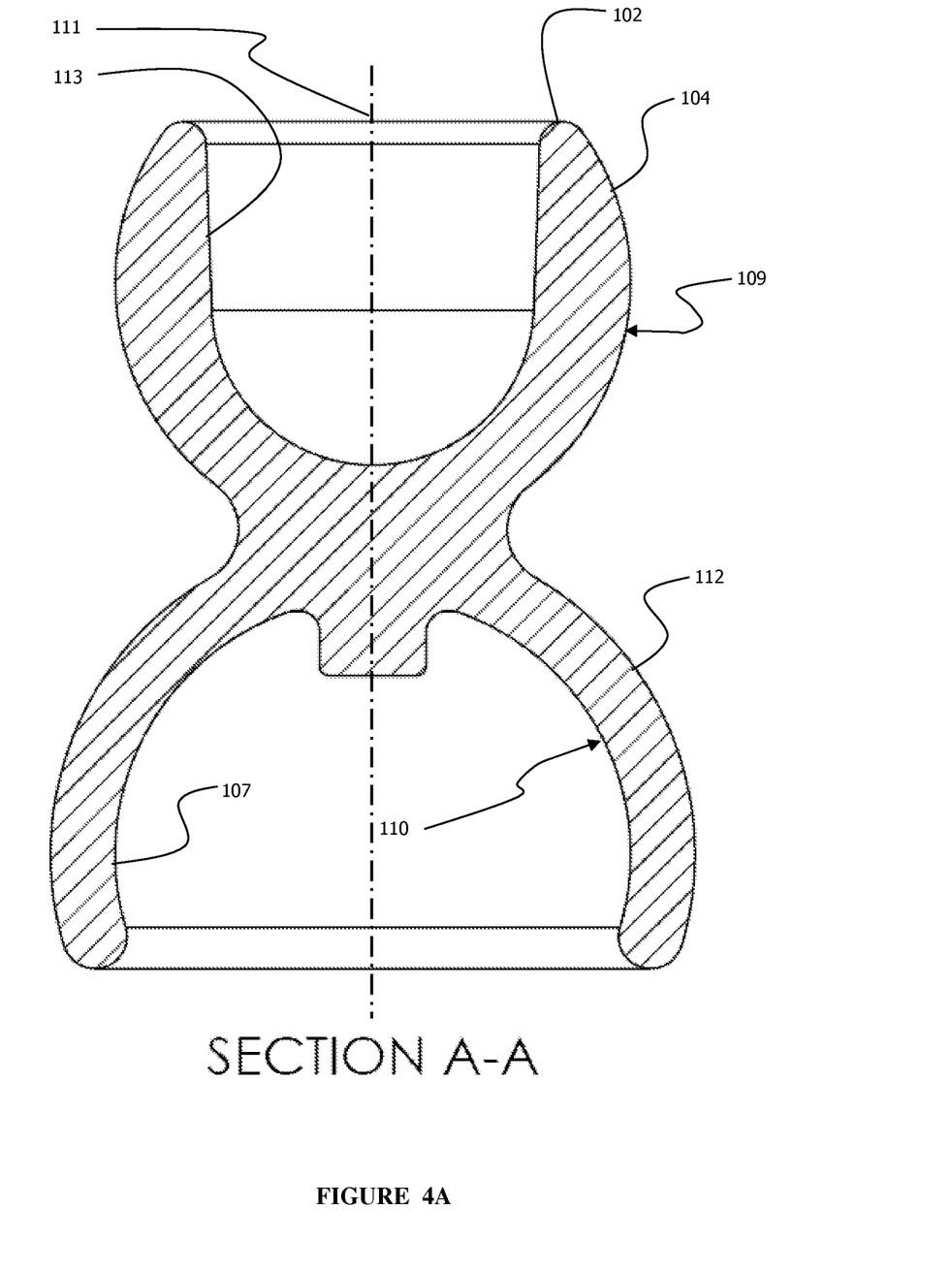
FIG. 4A is a cross-sectional view of a connector according to some embodiments of the present invention.

As seen in FIG. 4, the connector 101 has a primary axis 111 in some embodiments. The connector 101 may be symmetric around the primary axis 111 in some embodiments. The end surface planes of the first and second end portions of the connector may be perpendicular to the primary axis 111 in some embodiments.

In some embodiments of the present invention, the wall thicknesses of the internal socket receiving cavity or the socket engaging end surface, or both, are constructed so that an interference fit remains after the ball and socket joint connectors are connected. In some embodiments, the interference fit is designed such that the material is stressed to a stress level below that of the plastic limit but above the creep limit. The material may then creep until the interference is at or below the creep limit, typically down to the upper end of the elastic deformation stress range of the material. In such an embodiment using a plurality of connectors connected together to form a longer chain, the stresses will tend to equalize in the different connector pairs. This equalization of stresses will tend to equalize the frictions of the various connector pairs. An equalization of the frictions in the connector pairs in a long chain of connected connectors will tend to allow the chain of connectors to bend in a smooth fashion when the chain is subjected to bending forces. For example, in a 10 unit chain bent to a 45 degree angle, the bending may be well spread among the connector pairs.

Figure 5:
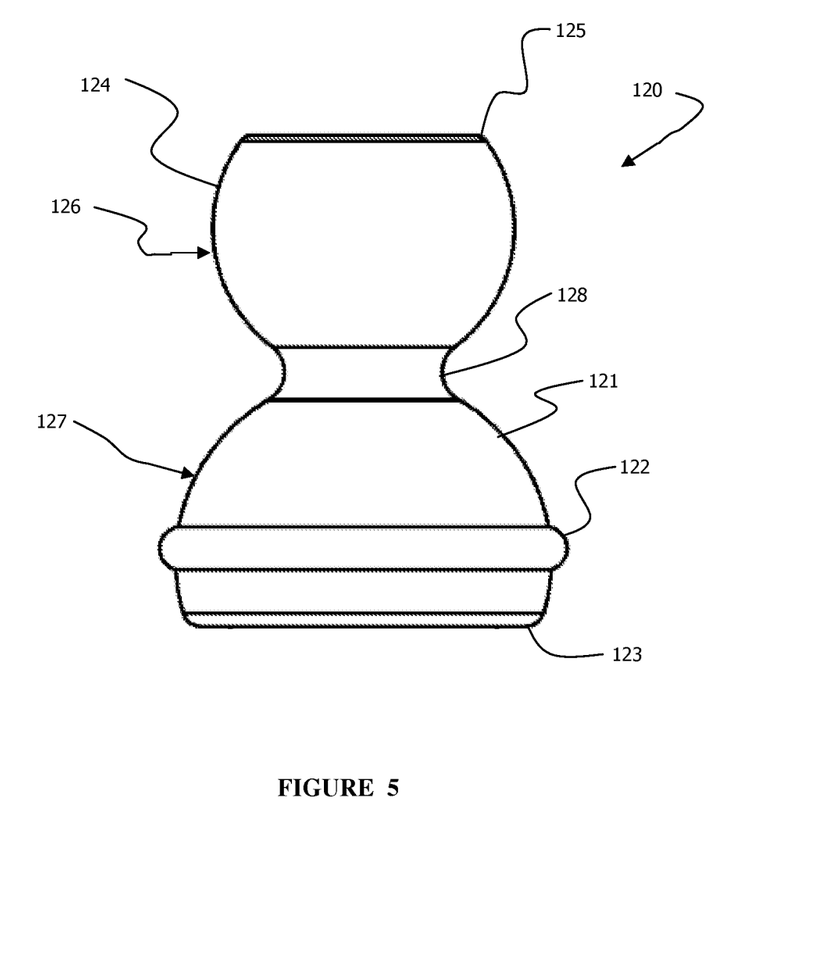
FIG. 5 is illustrates a connector with a gripping portion according to some embodiments of the present invention.
Figure 6:
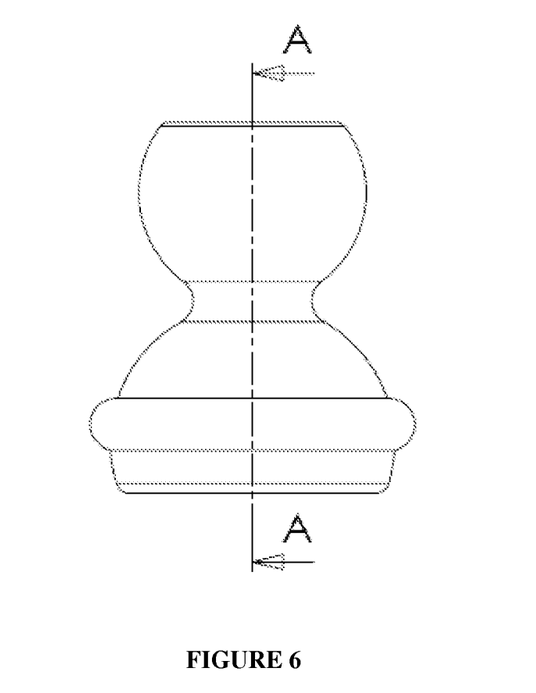
FIGS. 6 and 6A are a side and cross-sectional view of a connector with a gripping portion according to some embodiments of the present invention.
Figure 6A:
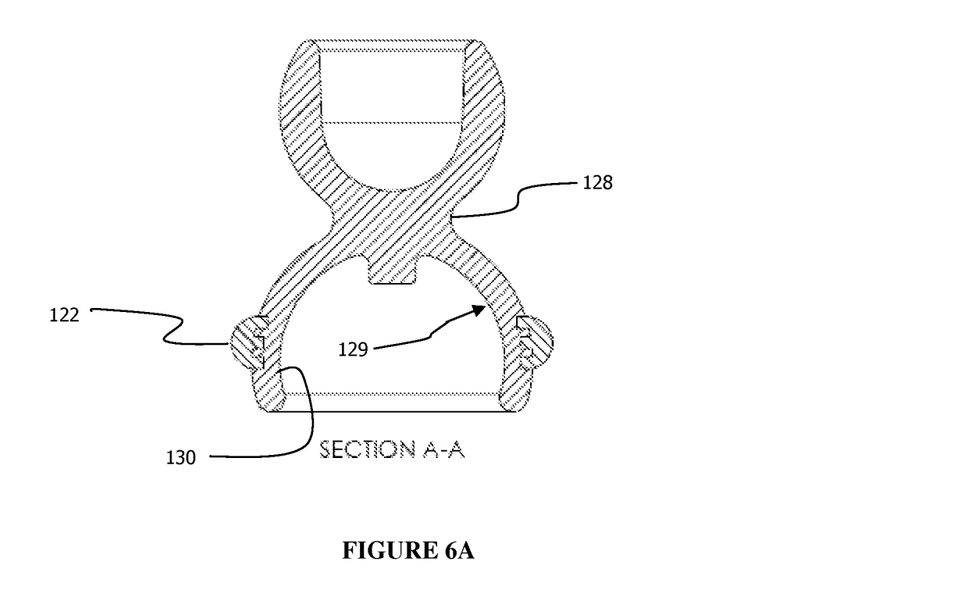

In some embodiments, as seen in FIGS. 5, 6 and 6A, a connector 120 includes a gripping portion 122. The connector 120 has a first end portion 125 and a second end portion 123. A socket engaging end surface 124 is present at the first end 125. The first end portion 125 is substantially hollowed out.

The second end 123 has a body 121 with an internal socket receiving cavity 130. The inner surface 129 of the an internal socket receiving cavity 130 is adapted to fit over the socket engaging end surface 124 of another connector, or of another piece with a similar socket engaging end surface. A neckdown 128 separates the first end portion 125 from the second end portion 123. A gripping portion 122 allows the connector to grip surfaces more readily. In some embodiments, the gripping portion is co-molded into the connector body. In some embodiments, the gripping portion is a rubberized compound. In some embodiments, the gripping portion is a circumferential ring molded into the outer surface of the connector. The gripping portion may provide a higher friction interface when the connector is set upon or wrapped around an object.

In some embodiments of the present invention, the outer surface 109 of the socket engaging end surface 104 may be lubricated. Lubrication of the outer surface 109 of the socket engaging end surface 104 may allow for more even frictions between various connections in a chain of connectors. In some embodiments, the inner surface 110 of the internal socket receiving cavity 107 may be lubricated. Lubrication of the inner surface 110 of the internal socket receiving cavity 107 may allow for more even frictions. In some embodiments, both the outer surface 109 of the socket engaging end surface 104 and the inner surface 110 of the an internal socket receiving cavity 107 may be lubricated. In some embodiments, the surfaces may be coated with an adhesive. With some connector materials, such as acetyl materials, Delrin, and Nylon, compounds normally used as adhesive may function as a lubricant when used in an interference fit ball and socket joint connector.

In some embodiments of the present invention, the outer surface 109 of the socket engaging end surface 104 may be textured. The texture may take the form of a surface roughness. Texturing of the outer surface 109 of the socket engaging end surface 104 may allow for more even frictions between various connections in a chain of connectors. In some embodiments, the inner surface 110 of the internal socket receiving cavity 107 may be textured. The texture may take the form of a surface roughness. Texturing of the inner surface 110 of the internal socket receiving cavity 107 may allow for more even frictions. In some embodiments, both the outer surface 109 of the socket engaging end surface 104 and the inner surface 110 of the an internal socket receiving cavity 107 may be lubricated.

FIG. 3 illustrates a cross-sectional view of a plurality of ball and socket joint connectors. In some embodiments of the present invention, a stop nub 108 resides within the internal socket receiving cavity. The inner rim 140 of the socket engaging end surface 104 is adapted to contact the stop nub 108 as the two connectors reach a certain angle relative to each other. The contact of the stop nub 108 and the inner rim 140 of the socket engaging end surface 104 acts as a mechanical stop with regard to further angulation of the two pieces relative to each other. The mechanical stop function works to prevent over-rotation and possible disconnection of the two connectors.

Figure 7:
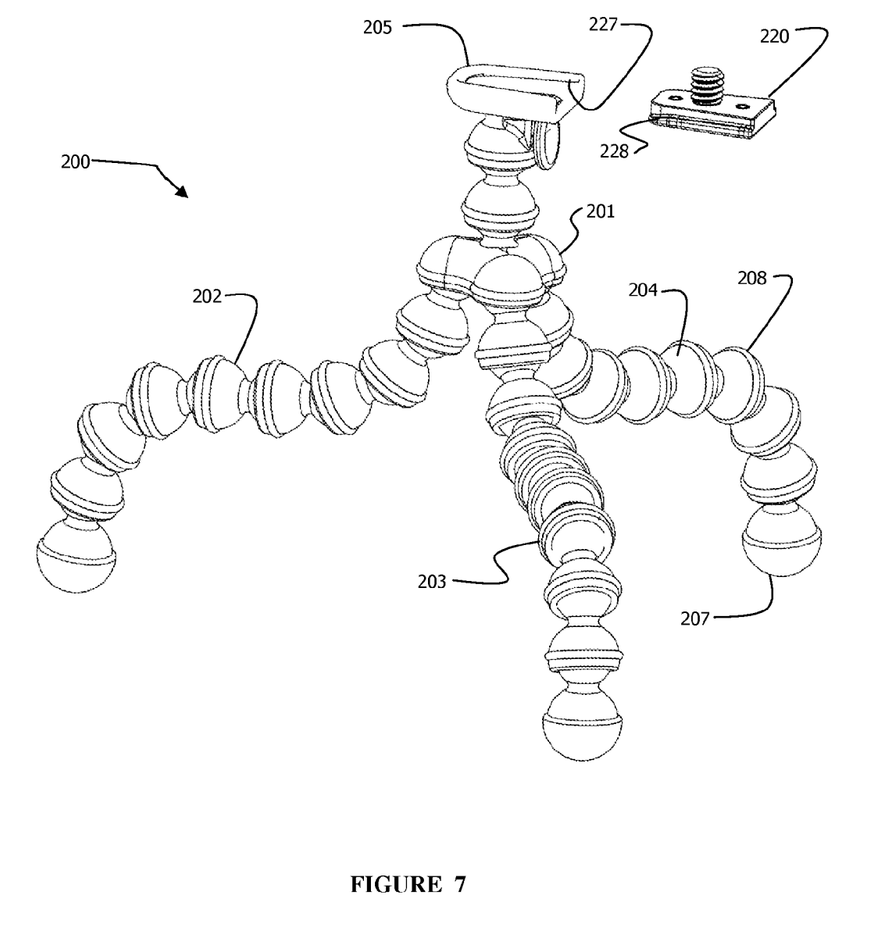
FIG. 7 is an illustration of a tripod apparatus according to some embodiments of the present invention.

FIG. 7 illustrates a tripod apparatus 200 according to some embodiments of the present invention. A body portion 201 provides a base of support for three flexible legs 202, 203, 204. The flexible legs 202, 203, 204 consist of a series of interconnected ball and socket joint connectors. The flexible legs are able to be flexed into a variety of positions and can be used to support the body portion 201 by forming tripod support. The flexible legs are able to adapt to uneven surfaces to allow the tripod to function in a variety of situations. Although three legs are used here for illustration, more legs may be present in some embodiments. As seen in FIG. 7, the body portion 201 itself may have a series of interconnected ball and socket joint connectors within it, allowing for even more flexibility with regard to its mounting function.

Although the flexible legs are illustrated as functioning legs in FIG. 7, the legs are of sufficient flexibility that the may be used to wrap around items such as bars or other objects in order to fasten the tripod apparatus to objects that would not be suitable for mounting of a typical tripod. In conjunction with the gripping portion, this allows the tripod apparatus to be fastened to a variety of objects. For example, when used to position a digital camera, the legs may wrap around a vertical gate rail, allowing the mounting of the camera for a photo taking opportunity not previously available.

In some embodiments, the body portion 201 is connected to an interconnect portion 205. A clip 220 is removably fastened to the interconnect portion 205. The clip 220 may have a threaded post adapted to fit into a camera or other device in some embodiments.

In some embodiments, the flexible legs 202, 203, 204 may use connectors that have a co-molded gripping portion 208. The gripping portions 208 may allow for use of the tripod in a variety of ways, including wrapping of the legs around a post or other object. In some embodiments, the flexible legs may be terminated with a gripping pod 207. As seen in cross-section in FIG. 3, the gripping pod 207 may be fully molded into the cavity of the connector. In some embodiments, the terminal connector of each leg has a socket engaging end surface on its first end and a suction cup on its second end. The suctions cups may allow for a secure attachment of the tripod apparatus 200 to a variety of surfaces.

Figure 8:
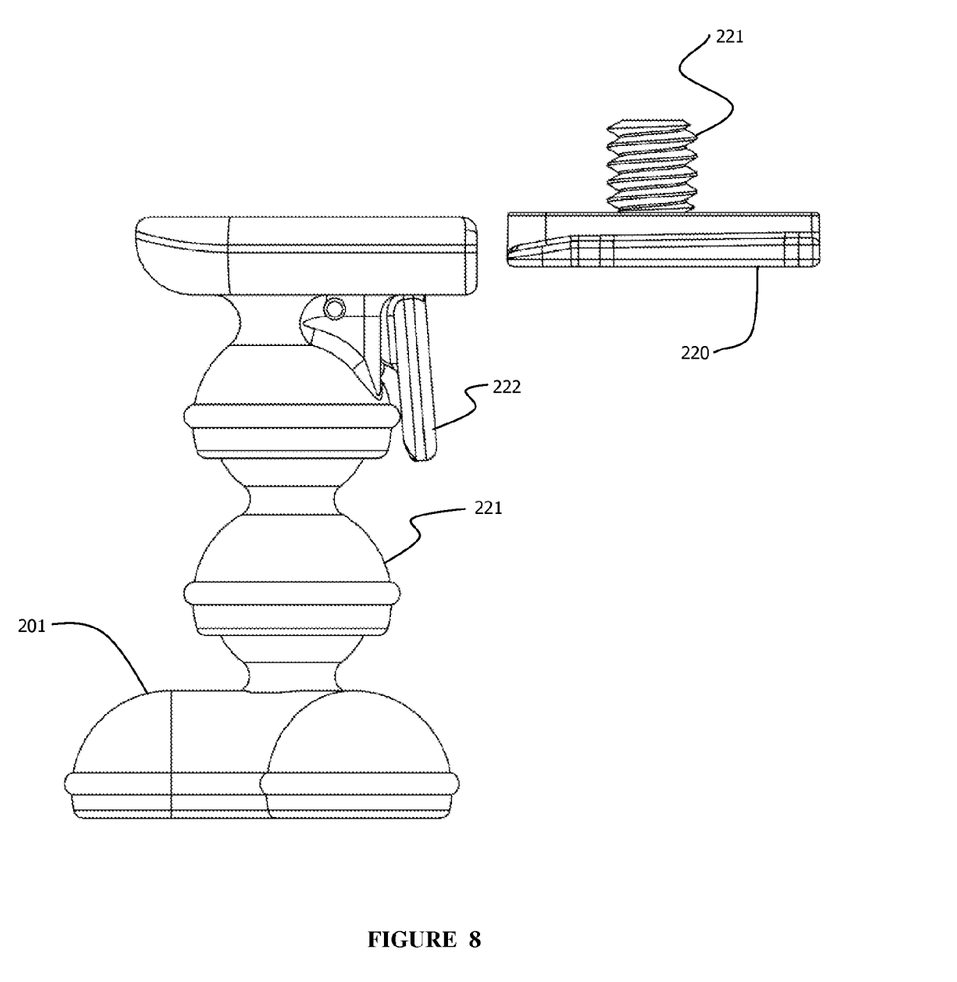
FIG. 8 is an illustration of a body and interconnect portion of a tripod apparatus according to some embodiments of the present invention.
Figure 9:
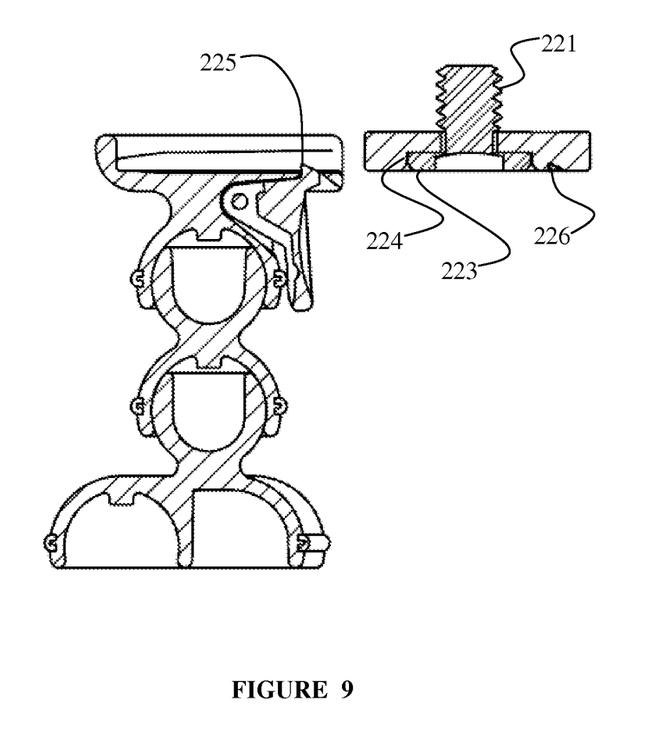
FIG. 9 is a cross-sectional view of a body and interconnect portion of a tripod apparatus according to some embodiments of the present invention.
Figure 10:
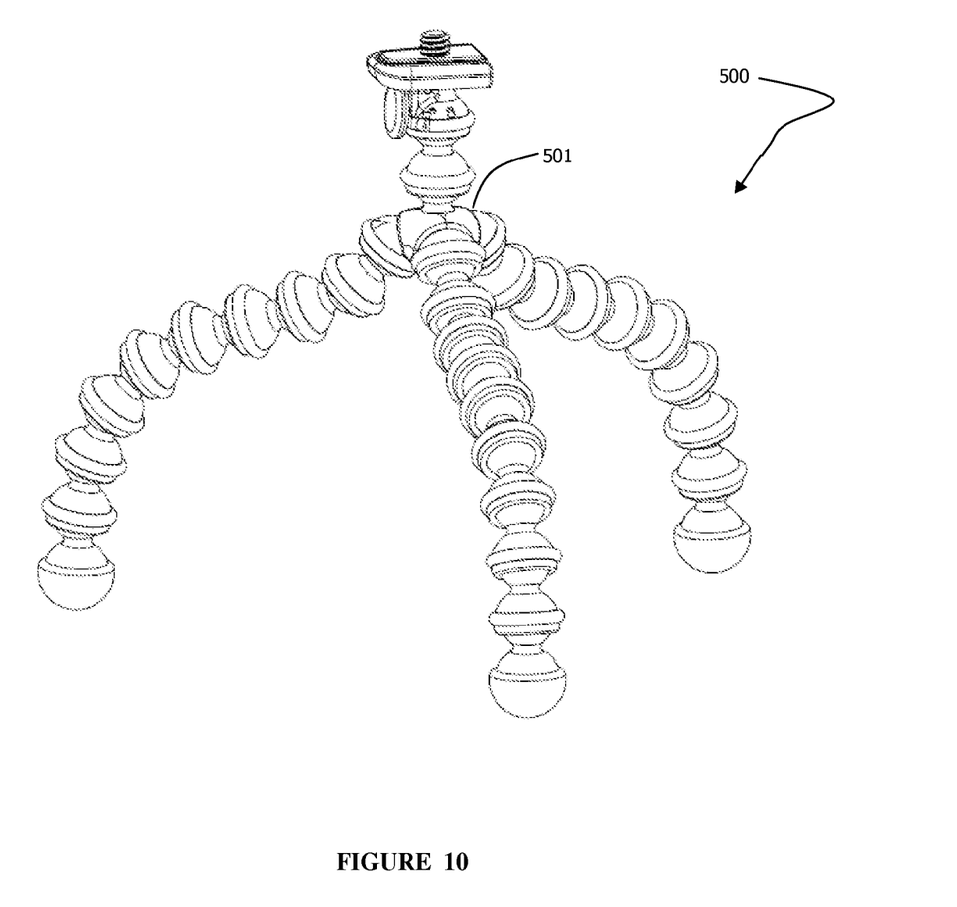
FIG. 10 is an illustration of a tripod apparatus according to some embodiments of the present invention.
Figure 11:
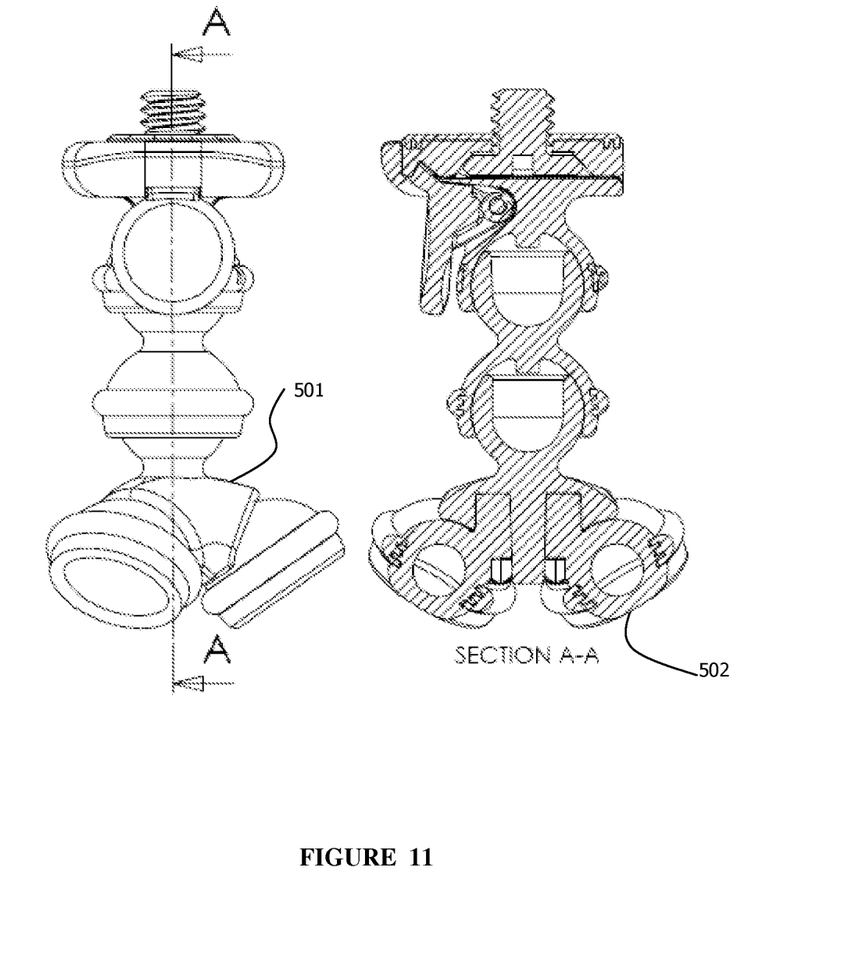
FIG. 11 is a side and cross-sectional view of a body and interconnect portion of a tripod apparatus according to some embodiments of the present invention.
Figure 12:
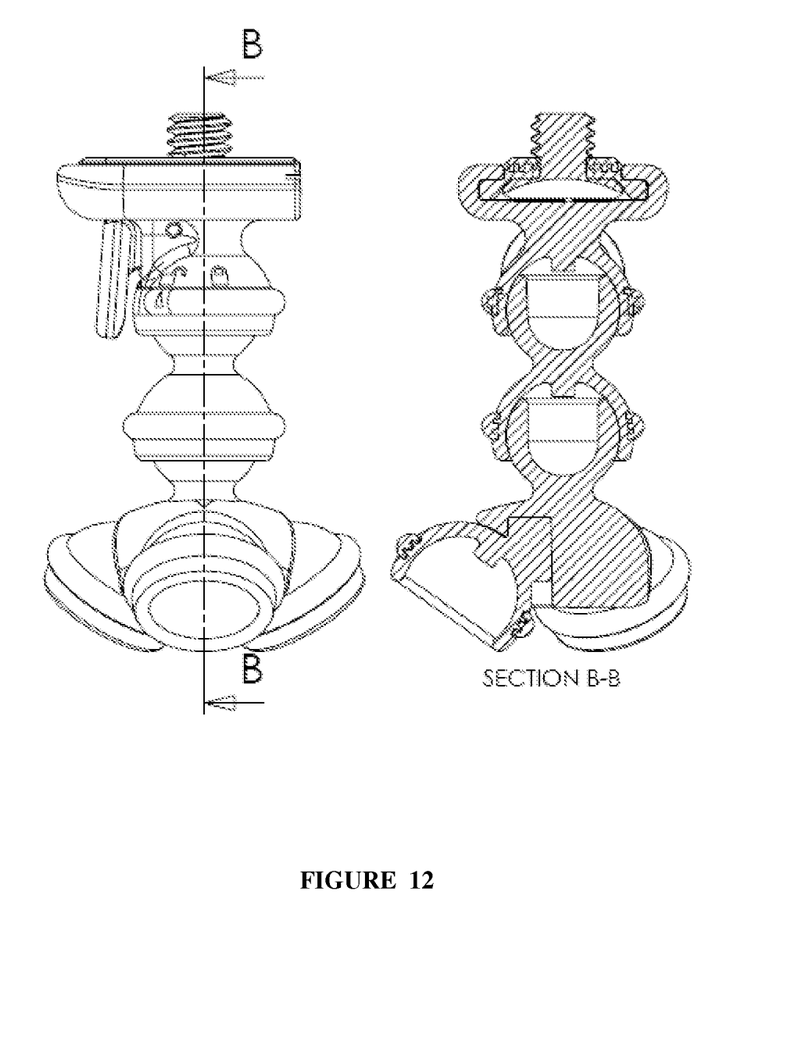
FIG. 12 is a side and cross-sectional view of a body and interconnect portion of a tripod apparatus according to some embodiments of the present invention.
Figure 13:
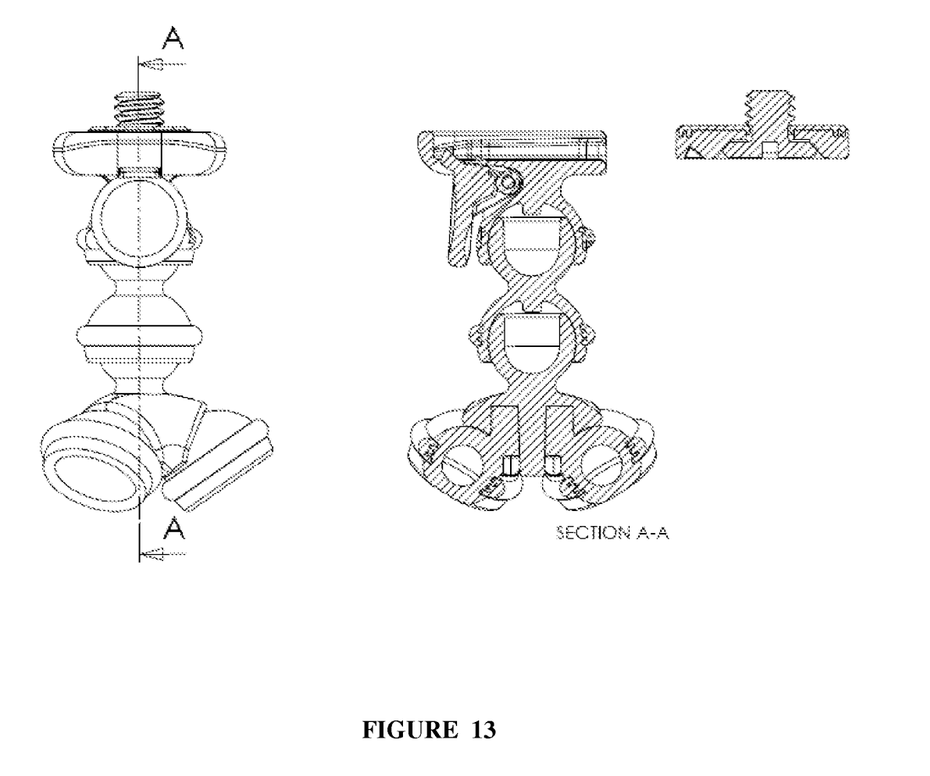
FIG. 13 is a side and cross-sectional view of a body and interconnect portion of a tripod apparatus according to some embodiments of the present invention.

In some embodiments of the present invention, as further illustrated in FIGS. 7, 8 and 9, the interconnect portion 205 is adapted to receive a clip 220. The clip 220 may have rails 228 adapted to slide into slots 227 within the interconnect portion 205. The clip 220 may have recess 226 adapted to be filled by a tab 225 on a spring loaded lever 222. The clip is removably attached to the interconnect portion 205 and may be released by pressing on the lever 222. In some embodiments, the lever 222 is on the same side of the interconnect portion 205 as which the clip 220 slides in on. In other embodiments, the lever 222 is on the side opposite that which the clip 220 slides in on.

A mounting screw 221 may be recess mounted into the clip 220 in some embodiments. The screw 223 may be of the standard size and thread to attach to a camera in some embodiments. The head 223 of the screw 221 may be held into the recess 224 by a slight ridge in the molding of the recess in some embodiments.

In some embodiments of the present invention, as seen in FIGS. 10, 11, 12, and 13, a tripod apparatus 500 utilizes a body portion 501 which spaces and locates the legs of the apparatus in a different configuration. The spacing of the body sockets 502 allows for better use of the tripod legs as attaching arms in some uses. In some embodiments, the body sockets 502 are equally spaced around the center of the body portion 501. The body sockets are also flared at an angle relative to the ground (in typical usage). In some embodiments, the flared angle is 45 degrees. The flaring of the body sockets allows a different range of potential wrapping angles for the legs of the tripod.

With the flaring of the body sockets, the tripod legs may still be utilized as in the case of a typical tripod. The range of motion of the body sockets and the connectors which form the legs still allow for vertical positioning of the legs. Thus, the body portion 501 retains the tripod's usual functionality. The flaring, however, allows for greater bending of the legs in cases where the legs are used as gripping arms, such as when wrapped around vertical bars and the like. Thus the body portion 501 adds to the range of positions and to the types of uses that the apparatus may entertain.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

I claim:

1. A tripod suitable for supporting a camera, the tripod comprising:
    three flexible legs, each of said flexible legs having sufficient flexibility to substantially wrap around an object, each of said legs having a first end attached to the body of the tripod;
    a body having a central axis and three sockets, said body comprising a first plurality of movably interconnected pieces movably interconnected to allow movement of a clip support, each of said three sockets having an associated opening and being arranged to pivotally receive an associated leg, wherein the socket openings are flared relative to the central axis such that they do not face in the same direction, to thereby facilitate a greater range of motion in their associated legs in a direction away from the central axis than would be possible if the openings all faced in the same direction; and
    a clip support carried by the body, wherein said clip support is attached to one of the pieces of said first plurality of movably interconnected pieces, the clip support having a releasable latch, wherein
    the clip support is suitable for releasably receiving a clip member to facilitate attaching or releasing the clip member to the tripod.

2. The tripod of claim 1 wherein said clip support is integral to one of the pieces of said first plurality of movably interconnected pieces.

3. A tripod as recited in claim 1, wherein each of said three flexible legs is composed of a multiplicity of connector pieces that join together in ball and socket joints that permit pivotable movement between connecting ball and socket components to together provide each leg with sufficient flexibility to substantially wrap around an object, and wherein each of said legs has a ball feature on said first end interconnected with an associated socket of said body of said tripod.

4. A tripod as recited in claim 3, wherein each ball and socket joint in the legs has a socket member portion having a maximum diameter, and a socket opening that receives an associated ball member, each ball and socket joint further comprising a gripping member formed on an exterior surface of the associated socket member portion, the gripping member being formed from a different material than the associated socket member portion and having a maximum diameter that is greater than a maximum diameter of the associated socket member portion.

5. A tripod as recited in claim 1, wherein said clip support further comprises a base, a floor carried by the base, and flanges that define slots that extend above the floor and splay apart towards a clip receiving opening, and wherein said releasable latch is pivotably secured to the base and includes a tab.

6. A tripod as recited in claim 5, wherein the releasable latch further includes a spring loaded lever that includes the tab and a push button, and wherein the releasable latch is arranged such that the tab protrudes through the floor sufficiently to be capable of engaging a clip in a latched position and such that the tab does not substantially protrude through the floor in an unlatched position.

7. A tripod suitable for supporting a camera, the tripod comprising:
    three flexible legs that have sufficient flexibility to substantially wrap around an object, wherein each of said three flexible legs is composed of a multiplicity of connector pieces that join together in ball and socket joints that permit pivotable movement between connecting ball and socket components to together provide each leg with sufficient flexibility to substantially wrap around an object, and wherein each ball and socket joint in the legs has a socket member portion having a maximum diameter, and a socket opening that receives an associated ball member, each ball and socket joint further comprising a gripping member formed on an exterior surface of the associated socket member portion, the gripping member being formed from a different material than the associated socket member portion and having a maximum diameter that is greater than a maximum diameter of the associated socket member portion;
    a body having three ports and having a first plurality of movably interconnected pieces movably interconnected to allow movement of a clip support, each port being arranged to receive an associated leg; and
    a clip support carried by the body, wherein said clip support is attached to one of the pieces of said first plurality of movably interconnected pieces, the clip support having a releasable latch, wherein
    the clip support is suitable for releasably receiving a clip member to facilitate attaching or releasing the clip member to the tripod.

8. The tripod of claim 7 wherein said clip support is integral to one of the pieces of said first plurality of movable interconnected pieces.

9. A tripod as recited in claim 7, wherein said clip support further comprises a base, a floor carried by the base, and flanges that define slots that extend above the floor and splay apart towards a clip receiving opening, and wherein said releasable latch is pivotably secured to the base and includes a tab.

10. A tripod as recited in claim 9, wherein the releasable latch further includes a spring loaded lever that includes the tab and a push button, and wherein the releasable latch is arranged such that the tab protrudes through the floor sufficiently to be capable of engaging a clip in a latched position and such that the tab does not substantially protrude through the floor.

11. The tripod of claim 7, wherein said releasable latch is adapted to release a clip from said clip support by manipulating a release portion.

12. A tripod suitable for supporting a camera, the tripod comprising:
    three flexible legs that have sufficient flexibility to substantially wrap around an object, said legs comprising a plurality of interconnected pieces, said legs comprising a plurality of gripping members formed on one or more exterior surfaces of said legs, the gripping members being formed from a different material than the associated interconnected pieces and having a maximum diameter that is greater than a maximum diameter of the associated socket member portion;

a body having three ports and having a first plurality of movably interconnected pieces movably interconnected to allow movement of a clip support, each port being arranged to receive an associated leg; and a clip support carried by the body, wherein said clip support is attached to one of the pieces of said first plurality of movably interconnected pieces, the clip support having a releasable latch, wherein the clip support is suitable for releasably receiving a clip member to facilitate attaching or releasing the clip member to the tripod.

13. The tripod of claim 12 wherein said clip support is integral to one of the pieces of said first plurality of movable interconnected pieces.

14. A tripod as recited in claim 12, wherein said clip support further comprises a base, a floor carried by the base, and flanges that define slots that extend above the floor and splay apart towards a clip receiving opening, and wherein said releasable latch is pivotably secured to the base and includes a tab.

15. A tripod as recited in claim 14, wherein the releasable latch further includes a spring loaded lever that includes the tab and a push button, and wherein the releasable latch is arranged such that the tab protrudes through the floor sufficiently to be capable of engaging a clip in a latched position and such that the tab does not substantially protrude through the floor.

* * * * *